(12) United States Patent
Gus (10) Patent No.: US 9,022,835 B1
(45) Date of Patent: May 5, 2015

(54) MOBILE ABRASIVE BLASTING MATERIAL SEPARATION DEVICE AND METHOD

(71) Applicant: Lyras Gus, Lowellville, OH (US)

(72) Inventor: Lyras Gus, Lowellville, OH (US)

(*) Notice: Subject to any disclaimer, the term of this patent is extended or adjusted under 35 U.S.C. 154(b) by 276 days.

(21) Appl. No.: 13/763,898

(22) Filed: Feb. 11, 2013

(51) Int. Cl.
*B24C 9/00* (2006.01)

(52) U.S. Cl.
CPC .......................... *B24C 9/006* (2013.01)

(58) Field of Classification Search
CPC ................................ B24C 9/003; B24C 9/006
USPC ............................................... 451/87–89
See application file for complete search history.

(56) References Cited

U.S. PATENT DOCUMENTS

| | | | | |
|---|---|---|---|---|
| 2,810,991 | A * | 10/1957 | Mead et al. | 451/88 |
| 2,935,820 | A * | 5/1960 | Mead | 451/88 |
| 3,934,374 | A * | 1/1976 | Leliaert | 451/88 |
| 4,156,600 | A * | 5/1979 | Jacobson | 55/285 |
| 4,394,256 | A * | 7/1983 | Goff | 209/135 |
| 4,449,331 | A * | 5/1984 | MacMillan | 451/88 |
| 4,646,482 | A * | 3/1987 | Chitjian | 451/87 |
| 4,753,052 | A * | 6/1988 | Dickson | 451/87 |
| 4,773,189 | A * | 9/1988 | MacMillan et al. | 451/88 |
| 4,943,368 | A * | 7/1990 | Gilbert et al. | 209/2 |
| 5,035,089 | A * | 7/1991 | Tillman et al. | 451/88 |
| 5,185,968 | A * | 2/1993 | Lyras | 451/38 |
| 5,195,640 | A * | 3/1993 | Seaverns | 209/2 |
| 5,231,806 | A * | 8/1993 | Swain | 451/88 |
| 5,257,479 | A * | 11/1993 | Swain | 451/92 |
| 5,269,424 | A * | 12/1993 | Lyras | 209/2 |
| 5,468,174 | A * | 11/1995 | Bachand et al. | 451/75 |
| 5,520,288 | A * | 5/1996 | Drenter et al. | 209/221 |
| 5,799,643 | A * | 9/1998 | Miyata et al. | 125/21 |
| 5,928,719 | A * | 7/1999 | Mishima et al. | 427/180 |
| 6,161,533 | A * | 12/2000 | Katsumata et al. | 125/21 |
| 6,514,128 | B1 * | 2/2003 | Lyras | 451/88 |
| 7,261,617 | B1 * | 8/2007 | Kim et al. | 451/38 |
| 8,764,513 | B1 * | 7/2014 | Spears | 451/2 |
| 8,920,210 | B2 * | 12/2014 | Benson | 451/8 |

* cited by examiner

*Primary Examiner* — Lee D Wilson
*Assistant Examiner* — Tyrone V Hall, Jr.
(74) *Attorney, Agent, or Firm* — Harpman & Harpman (57) ABSTRACT

The process and apparatus for mobile separation and recovery of used contaminants abrasive blasting material from a work site. Entrained contaminants within used blast material are removed by a self-contained mobile platform process using multiple stage cleaning system including dual cyclonic separation, multiple stage dust filters with large debris magnetic drum, airwash and vibratory separation in a flow through containment and blast media separation process.

15 Claims, 8 Drawing Sheets

MOBILE ABRASIVE BLASTING MATERIAL SEPARATION DEVICE AND METHOD

BACKGROUND OF THE INVENTION

1. Technical Field

This invention relates to devices and process to separate and recycle abrasive steel blast material from entrained contaminants including dust, paint, and rust encountered during use to clean and prepare a variety of surfaces in the industry.

2. Description of Prior Art

Prior art devices and processes have used a variety of fixed and mobile separation apparatus that clean and separates waste material from the shot blast and recycles for reuse. Examples of prior art patents can be seen as follows: U.S. Pat. Nos. 2,810,991, 3,716,941, 3,954,374, 4,449,331, 4,773,189, 4,943,368, applicant's U.S. Pat. Nos. 5,185,986, 5,468,174, 5,520,288, 5,695,385, and 6,514,128.

In U.S. Pat. No. 4,773,189 a separation system is disclosed for polymer blasting media which is cited to show multiple tasks separation system in which contaminated blast products are collected, processed and reused in a continuous manner. The hazardous contaminates being directed to separate disposable storage units within the process.

U.S. Pat. No. 3,716,946 uses a recirculation close system with air separation as the initial separation with a secondary magnetic separator for removal of ferrous shot from the remaining non-ferrous contaminates.

U.S. Pat. No. 4,449,331 shows shot blasting machinery used in communication with a blast cabinet module. The device is characterized by a feed and lift conveyor recirculating system in communication with the blast cabinet for transportation of spent contaminated shot to the top of a vertical separation stack.

U.S. Pat. No. 4,943,368, a non-metallic abrasive blasting material so recovering process is disclosed having multiple steps of size classification, ferro-magnetic separation, gravity separation, electrostatic separation which is used in separation of non-conductive paint from conductive blasting media.

U.S. Pat. No. 3,934,374 a sand blast reclamation system is disclosed using an airwash separator feeding a blast wheel. Contaminated air is directed to a fabric dust collector for filtration. A sand separator is positioned above the magnetic separator supplying usable sand back to the blast wheel via an internal elevator belt.

U.S. Pat. No. 2,810,991, an abrasive blasting apparatus is disclosed that provides for a movable self-contained blasting and separation unit that recovers the spent contaminated shot as it is used and recirculates same through a separation process. The separator uses an air driven grit reclaimer in combination with a transfer chamber.

In applicant's U.S. Pat. No. 5,185,968 a mobile separation system is disclosed wherein a multi-step magnetic and airwash separation is used.

U.S. Pat. No. 5,468,174 is directed to a recyclable abrasive blasting system having a classifier with auger screen separators and airwash.

U.S. Pat. No. 5,520,288 claims an abrasive grit material recovering system having a rotary screen separator, a magnetic separator, and an airwash on a mobile platform.

U.S. Pat. No. 5,695,385 shows a recyclable abrasive blasting system method using multiple auger screen separation and interconnected airwash to achieve particle separation.

Applicant's U.S. Pat. No. 6,514,128 discloses a separating abrasive blasting media from debris using a rotary drum separator with different size gradation interior surfaces.

SUMMARY OF THE INVENTION

A compact self-contained and powered low site impact mobile apparatus and system for separation of spent abrasive steel blasting shot from entrained contaminants using a multi-step and station material treatment having dual cyclonic stage separation and independent dust retention with inline mechanical and airwash material separation treatment. Retained, cleaned and recovered abrasive blasting media in transitional storage for direct use on site supply.

DETAILED DESCRIPTION OF THE INVENTION

Figure 1:
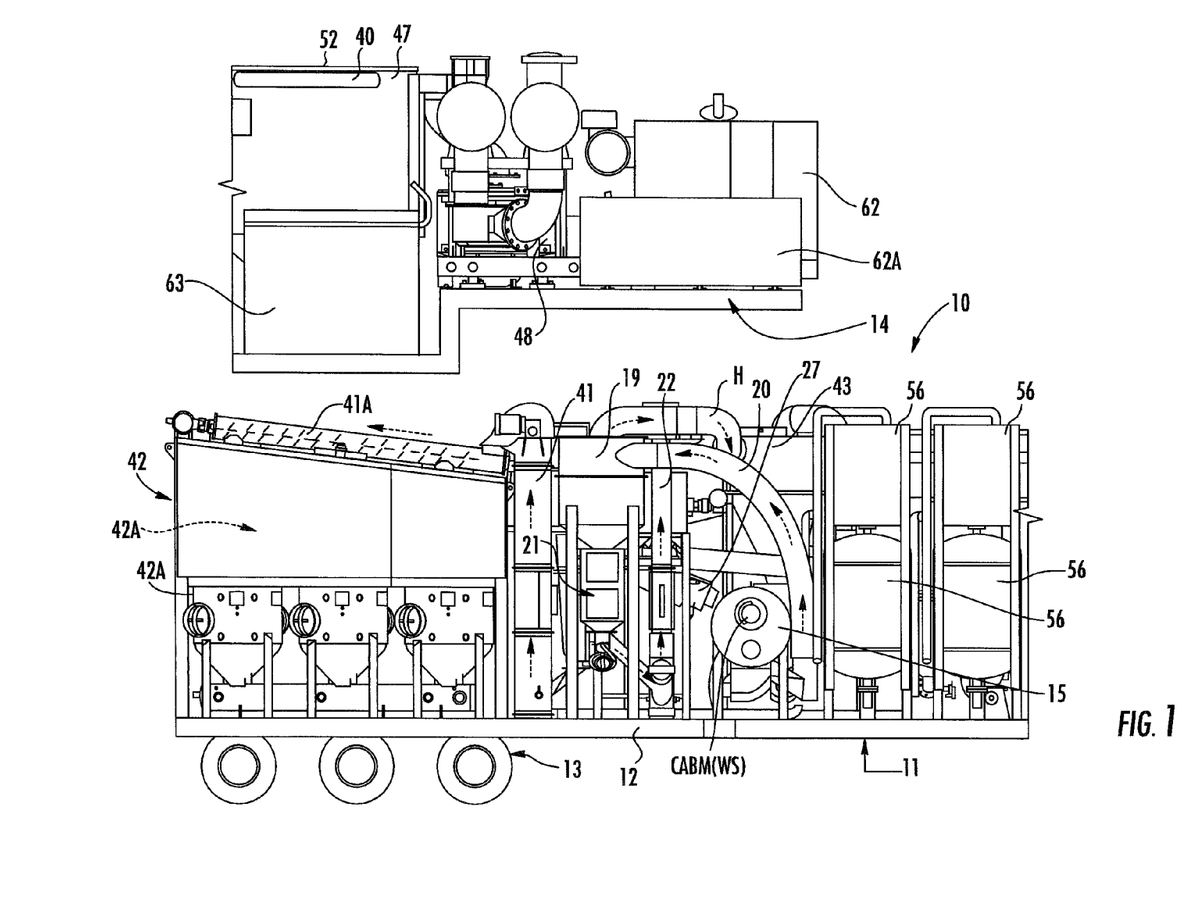
FIG. 1 is a side elevational view of the compact mobile separator apparatus and method of the invention.
Figure 2:
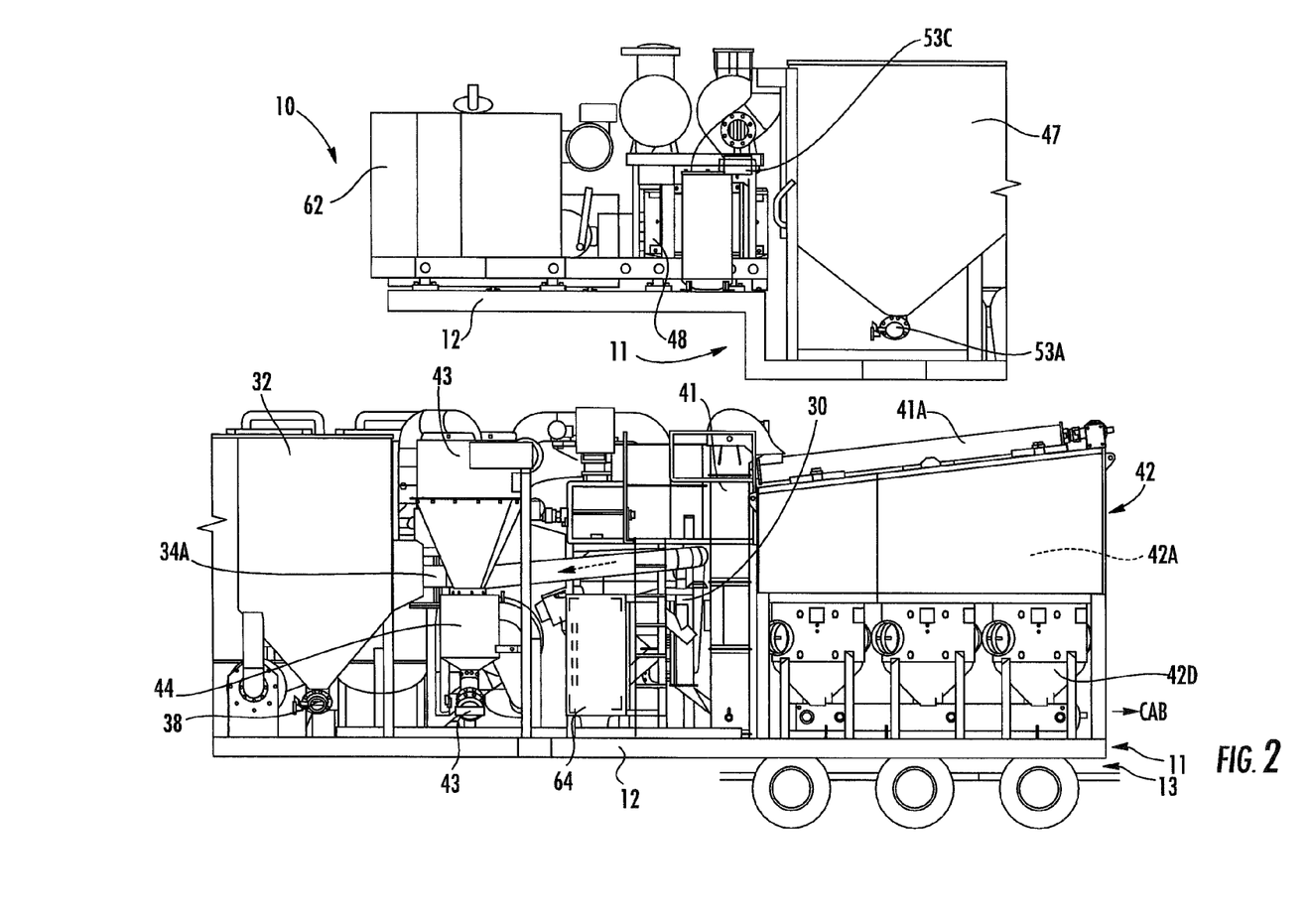
FIG. 2 is a rear elevational view of the compact mobile separator apparatus and method of the invention.
Figure 3:
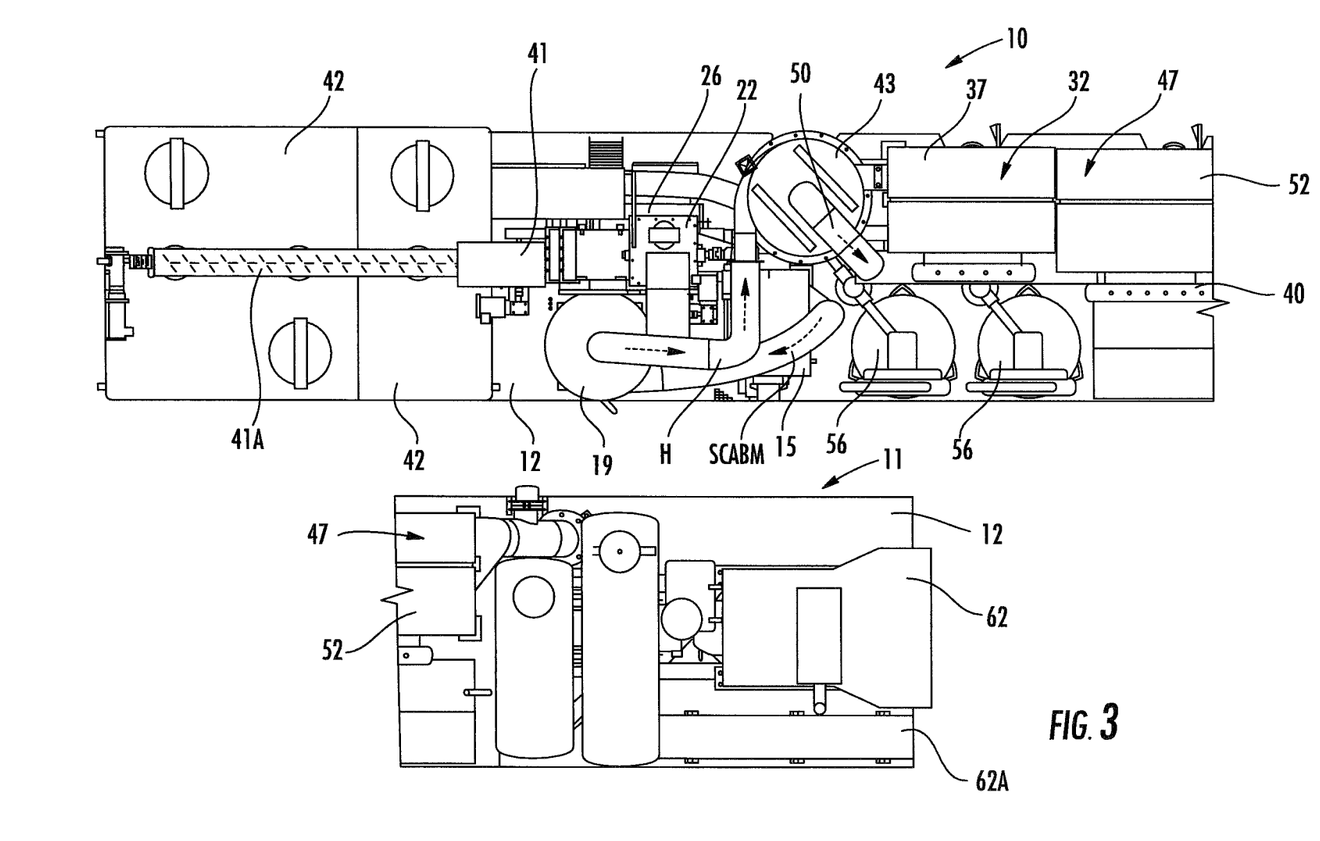
FIG. 3 is a top plan view thereof.
Figure 4:
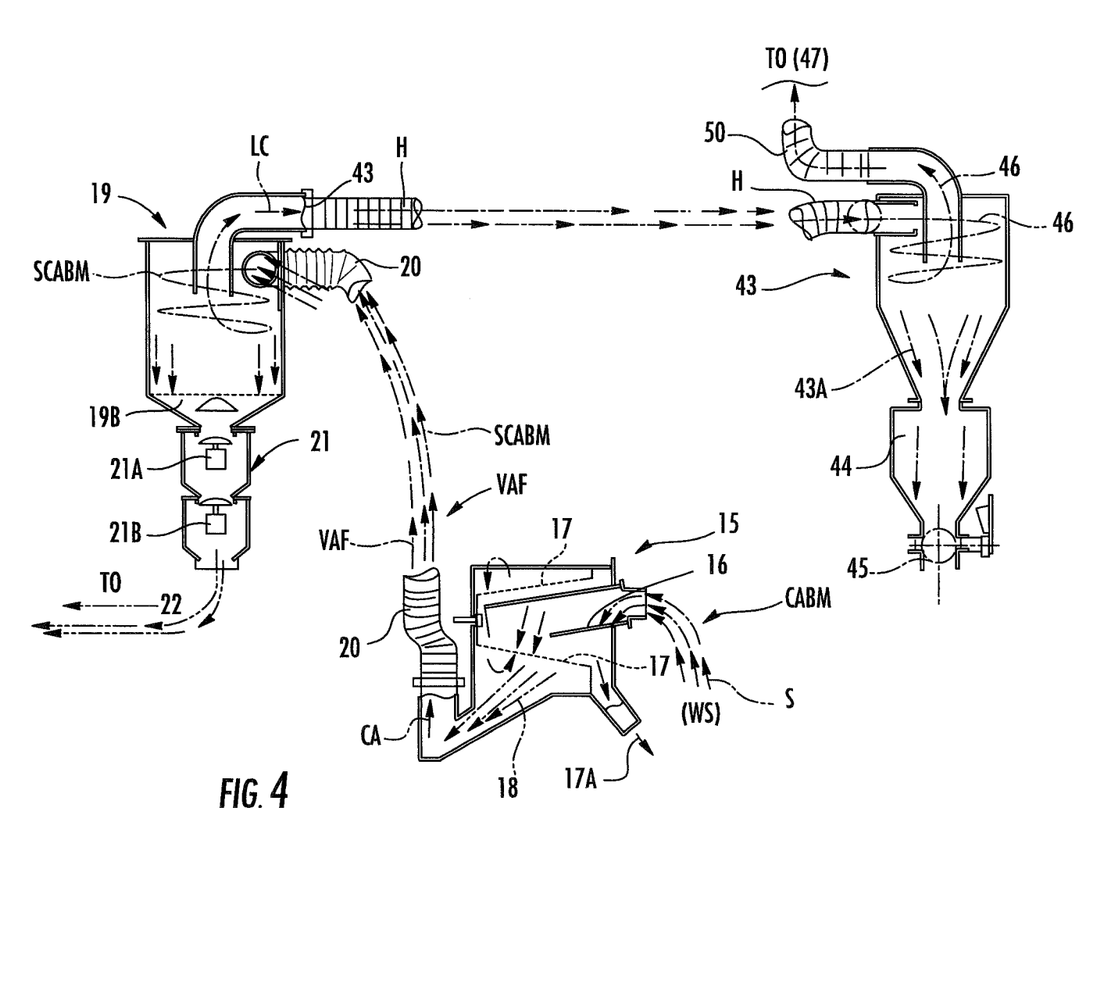
FIG. 4 is a graphic system process flow diagram of a first stage of the separation system of the invention.
Figure 5:
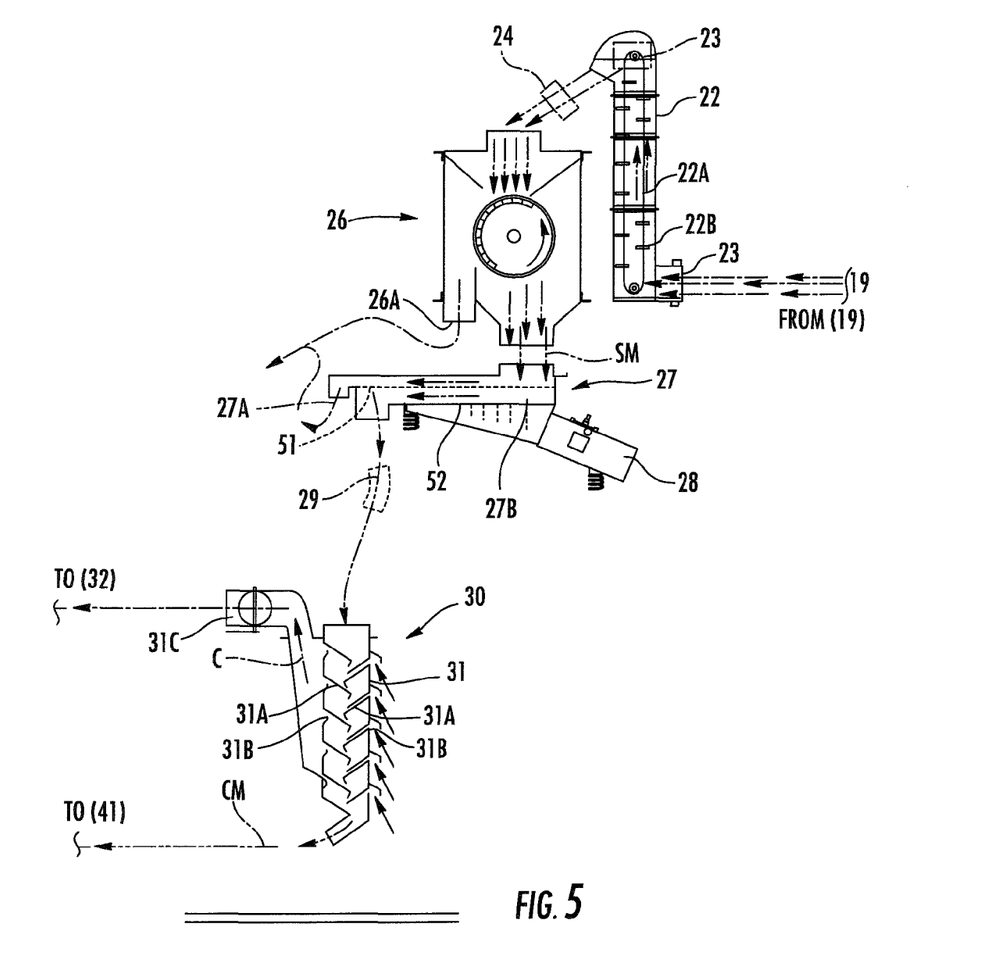
FIG. 5 is a graphic system process flow diagram of a second stage of the material separation and recovery system.

A process and mobile separation apparatus for separation and recovery of used steel blasting shot material can be seen in FIGS. 1-7 of the drawings. The mobile separation apparatus 10 is self-contained on a wheeled trailer 11 having a support frame 12 with dual wheel axle assemblies 13 and a hitch portion 14. The separation apparatus 10 is integrally secured on the trailer 11 allowing for mobile site specific positioning not available to large trailer separators for improved access and usability in the field. The separation apparatus 10 of the invention has an initial large debris (rocks), cylindrical drop out box 15 having an inlet transfer for contaminated abrasive blast material CABM from the work site WS to an inclined interior material engagement surface 16 with a large diameter affixed screen separator surface 17 extending in opposing angular inclination thereto. Screened large contents at 17A exit as waste therefrom. The drop out box 15 transfers remaining "screened" material at 18 entrained in a combination compressed airflow CA and vacuum airflow VAF into a primary initial cyclonic air separator 19 that receives the initially screened contaminated abrasive blasting material SCABM via a transport vacuum hose 20 from the drop out box 15. The primary cyclonic air separator 19 pulls off lighter contaminates in a cyclonic airstream allowing the remaining blast shot and entrained heavier contaminants to drop and accumulate within a grit/delivery storage area 19B as seen in FIGS. 1, 3 and 4 of the drawings. A double dump airlock assembly 21 has two compartmentalized dump valves 21A and 21B that selectively transfer accumulated contaminated blast shot after initial (cyclonic) separation into a first material bucket elevator 22 as seen in FIG. 5 of the drawings. The first material bucket elevator 22 has an infeed hopper area 23 receiving material from the primary cyclonic air separator 19 as hereinbefore described. The material bucket elevator 22 has an endless belt 22A with multiple longitudinally spaced material receiving buckets 22B positioned thereon. The endless belt 22A is driven by a motor control assembly 23 indicated graphically in the drawing and is normally found within the art of material transfer conveyance within the industry.

The dust contaminated blast shot material indicated at 24 is then deposited into a magnetic drum separator 26. The magnetic drum separator 26 provides for select particle engagement and magnetic attraction of contents as is well established and known within the art. Separated debris exit at 26A with the remaining magnetically separated material SM being deposited directly onto a vibratory screen separation classifier 27 that selectively sorts and classifies by screen S1 designated size opening for screen selection. Screened contents at 27A are transferred to "waste" as designated large debris while smaller classified contaminates 27B pass through a screen tray S2 into a collective storage dust hopper at 28 all well known and understood within the art of vibrating screen technology available and used commercially within the industry.

Screened abrasive shot blast material and remaining entrained related contaminants (dust) at 29 are then deposited in and vertically passed through a multi-stage airwasher 30 as is well known within the art which comprises a vertical chamber 31 having multiple angularly positioned veins 31A, each of which is positioned adjacent an outside air inlet 31B to effect a specific gravity air separation of the contaminated abrasive blast material is cascaded downwardly therethrough by gravity. The airwash effectively separates entrained lighter weight contaminates C including dust, forcing same upwardly through a return and removal passageway 31C to be drawn off by a first vacuum dust control system 32 comprising a low vac fan blower indicated at 33 connected to an outlet 34 of a low vac cartridge bag based dust filter assembly 35, best seen in FIG. 7 of the drawings. The low vac dust filter bag based assembly 35 has the first contaminant material inlet at 34A with a plurality of dust collector filter bag cartridges 36 therewithin. An access door 37 at the top and an oppositely disposed lower chamber clean out valve 38.

Figure 7:
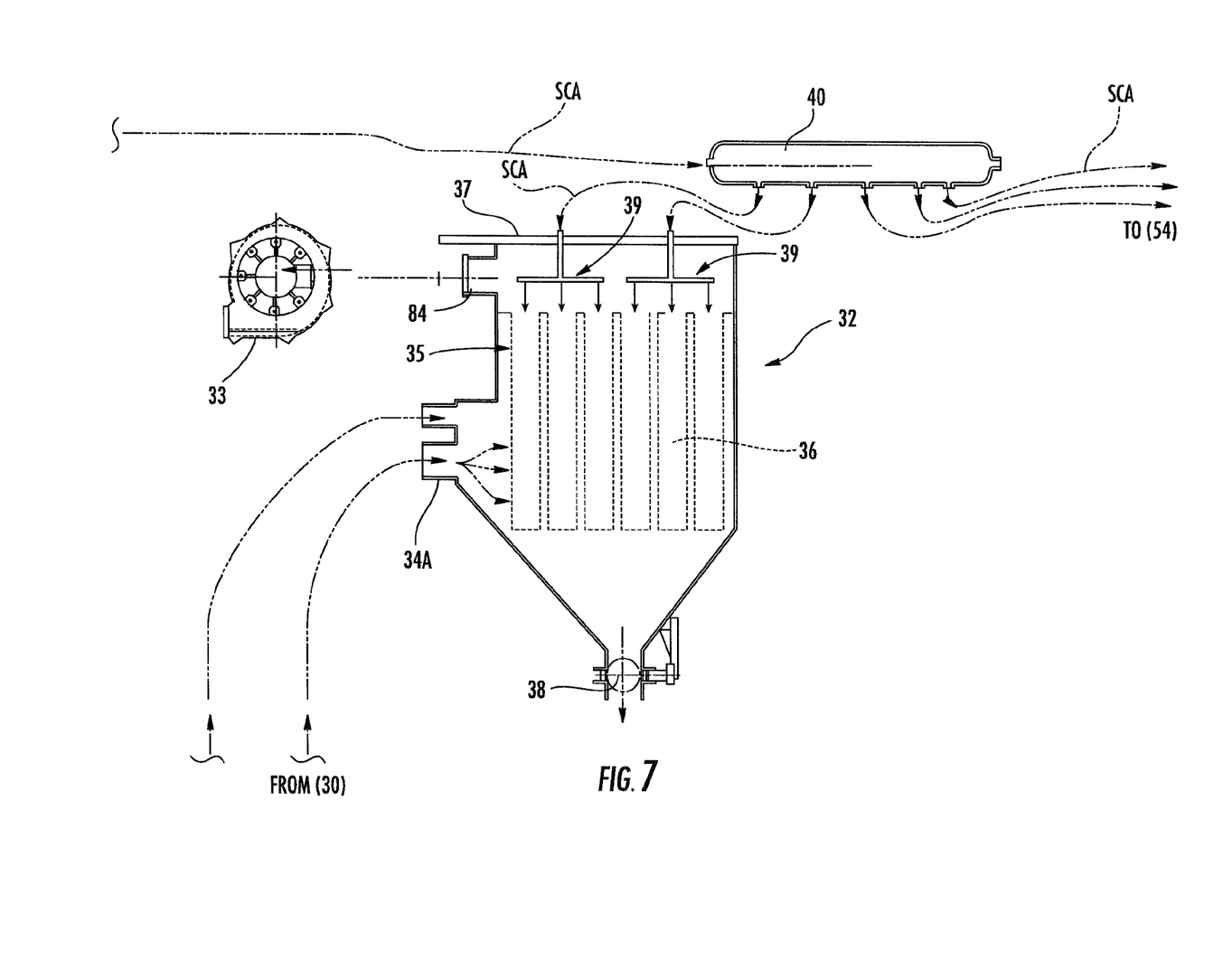
FIG. 7 is a graphic system process flow diagram of a fourth stage of the material separation and recovery system.
Figure 8:
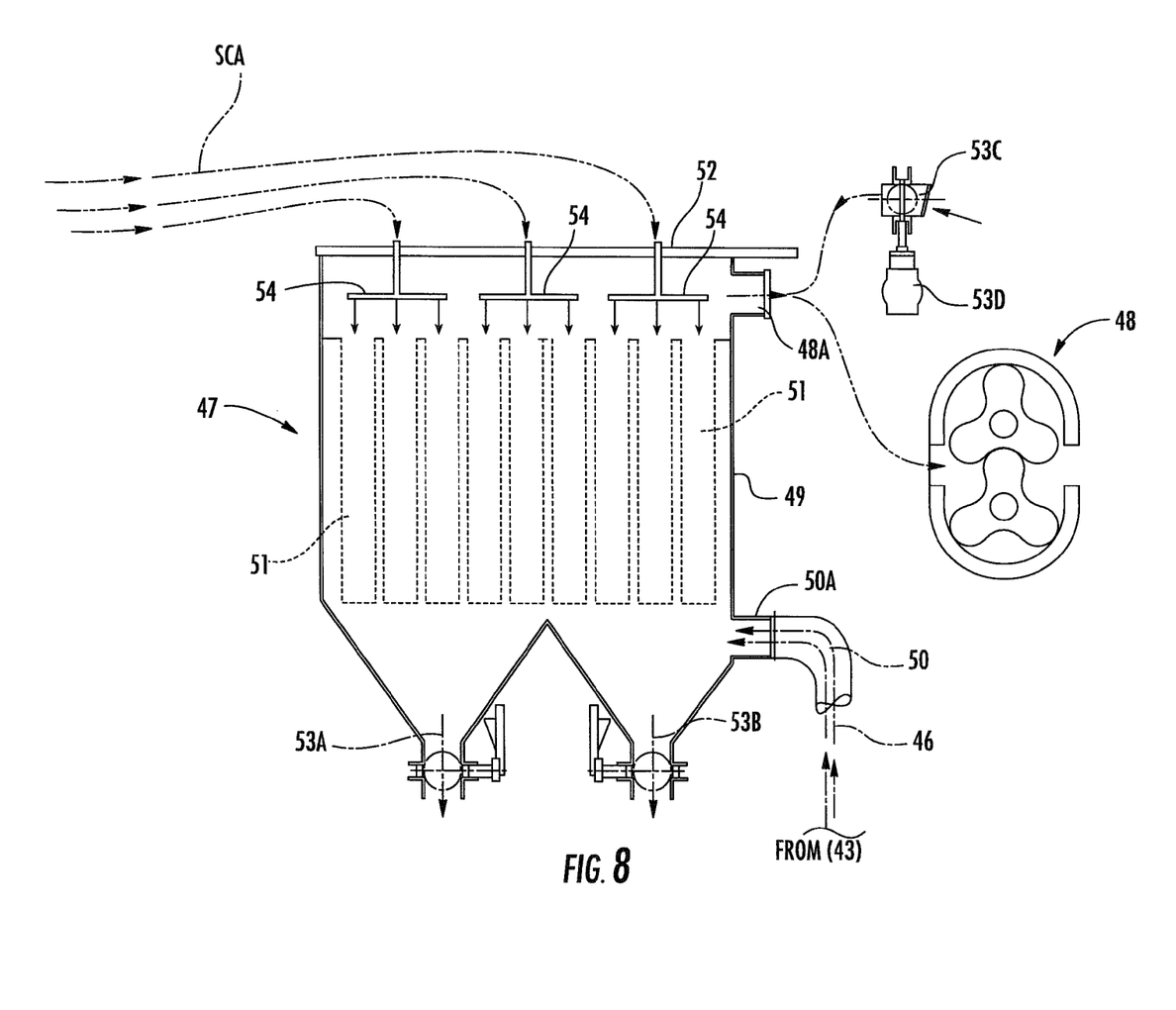
FIG. 8 is a graphic system process flow diagram of a fifth stage of the material separation and recovery system.

A compressed air filter purge multiple nozzle assembly 39 is positioned above the hereinbefore described multiple dust filter bag cartridges 36 and is in communication with a source of compressed air SCA via a distribution manifold 40 as will be described in greater detail hereinafter.

Referring back to FIG. 5 of the drawings the now cleaned and reusable blast shot material indicated at CM exits the bottom of the airwash 30 and is now transferred by a second material elevator 41 and deposited into a combination blast "grit" storage and blast supply pot 42 via a transfer screw conveyor 41A, best seen in FIGS. 1 and 3 of the drawings. The clean blast shot grit is initially held in an upper portion 42A separated by a contoured bottom 42B with a removable remotely operated material release valve 42C for releasing material therefrom into a lower blast pot portion 42D, read for re-use as will be described hereinafter.

Referring back to FIG. 4 of the drawings, the hereinbefore described cyclonic separator 19 will be seen, pulls off and separates the lighter contaminants LC through an outlet exit at 43 are transferred through a flexible hose H by a vacuum source to a second "medium dirt" designated cyclonic separator 43 which by cyclonic airflow action separates "medium dirt" drops out at 43A into a holding and removal chamber 44 with access actuation valve shown at 45.

The lighter "dust" contaminant indicated at 46 are forced upwardly and are drawn off by a second vacuum dust control system 47 comprising a high vac three lobed air injection high vac blower 48 as seen in FIG. 7 of the drawings supplying a vacuum circulation through a high vac dust filter dust cartridge bag filter house 49 interconnected to the cyclonic separator 43 via a transfer hose 50 into the high vacuum pressure filter inlet 50A. The high vac dust filter cartridge bag filter house 49 has a plurality of dust collector filter bag cartridges 51 therewithin with a top access panel 52 and two lower chamber clean out valves 53A and 53B on the inlet filter side. An atmospheric air inlet valve 53C with a vacuum break 53D is in communication with bag house outlet 48A interconnected to said blower 48.

Figure 6:
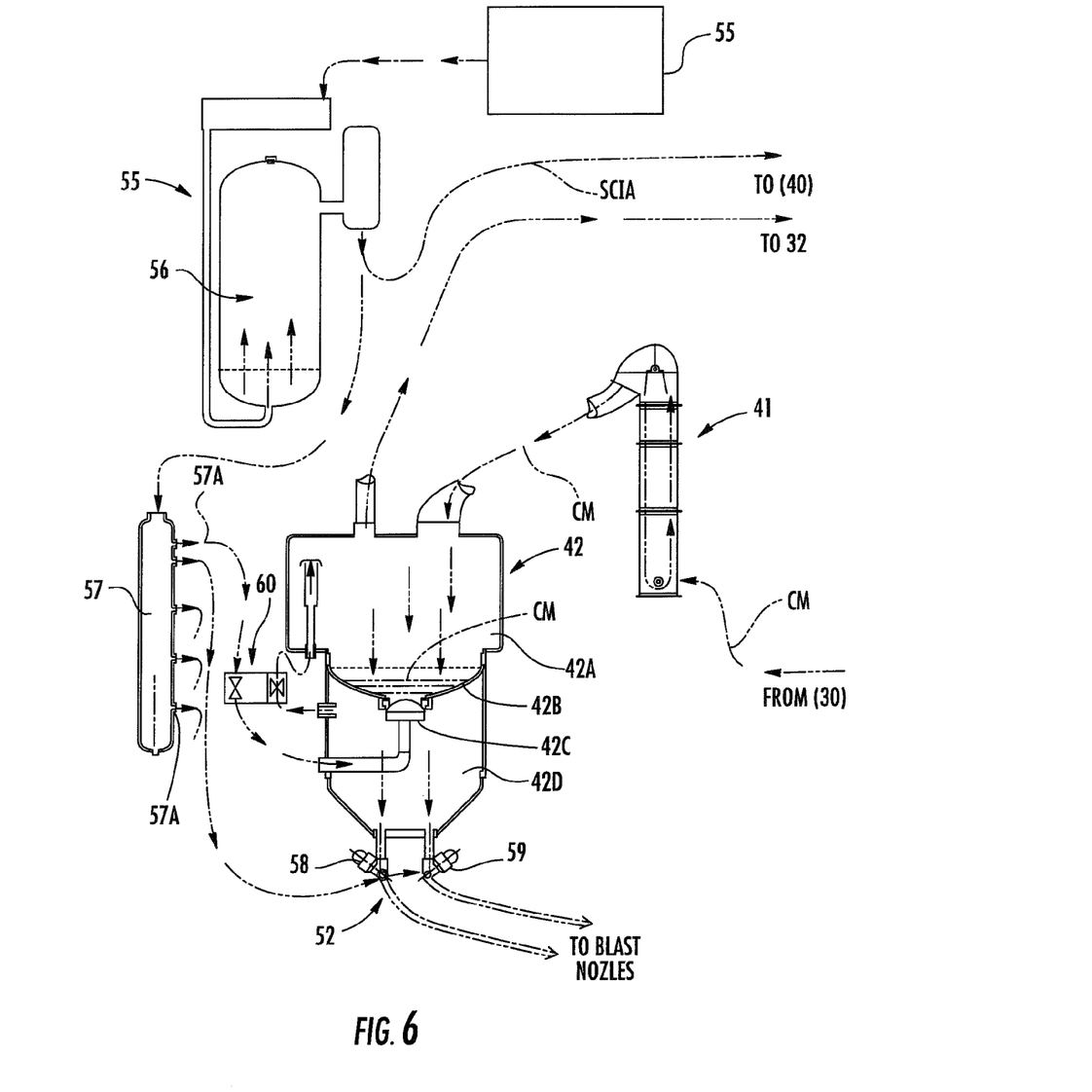
FIG. 6 is a graphic system process flow diagram of a third stage of the material separation and recovery system

A compressed air purge nozzle assembly 54 is positioned within the high vac dust filter bag cartridge house 49 above the respective filter bag cartridge 51 openings and are in communication with the hereinbefore described air distribution manifold 40 and a source of compressed air SCA, an off trailer compressor 55 via an on board air dryer 56 illustrated graphically in FIG. 6 of the drawings and in FIGS. 1, 2 and 3 of the drawings. The distributing manifold 40 also supplies the air purge nozzle assembly 39 in the low vac volume dust bag house 32 as hereinbefore described. It will be evident that the respective high and low vac bag house assemblies 32 and 47 provide for easy access for bag cartridge replacement and systematic cleaning via select air pulse introduced by the air purge respective nozzle assemblies 39 and 54. A second compressed air distributing manifold 57, as seen in FIG. 6 of the drawings, receives compressed air CA from the air dryers 56 and supplies via multiple compressed air outlets 57A to blast nozzle supply fittings 58 and 59 on the lower blast pot portion 42D and material release valve 42C by remote operated air supply valve control assembly 60.

In operation, contaminated abrasive blast shot "grit" CABM is collected from the work site WS and pulled directly into the primary drop out box 15 as described for the beginning of the combined self-contained mobile abrasive blast material stage separator and recycling platform process of the invention. After cleaning and separation by the process the cleaned and recycled abrasive shot blast material is drawn from the blast pot portion 42D of the grit storage and blast pot 42 by a transfer auger 42C for reuse via a high pressure compressed air injection at 52 as well known by those skilled in the art, as seen graphically in FIG. 6 of the drawings.

Operational activation and control is achieved through a central control panel 61 which affords user interface with the recycling system of the invention hereinbefore described. Power is supplied through the respective components depending on application requirements, in this example by a gasoline engine at 62 with a fuel tank 62A which is interconnected to the main blower assembly and an electrical generator 63 through a specific control panel 64 and interface control circuitry within well known and developed within the art for multiple equipment sequential stage control as is typically found in mobile oriented and power equipment, as seen in FIG. 1 of the drawings.

Only the currently improved disclosed system 10 of the invention affords a compact mobile self-contained extended multiple stage separation and cleaning of contaminated abrasive blasting material in an integrated selection and separation processing system providing unique onsite abilities independent of large system separators and affording a combination contaminant removal containment and disposing with recycled clean shot blast supplied directly to attached blasting equipment indicated graphically with indicia blast nozzles for a total work site adaption.

Thus it will be seen that a new and novel abrasive blasting separation and recycling mobile platform apparatus has been illustrated and described and it will be apparent to those skilled in the art that various changes and modifications may be made without departing from the spirit of the invention.

Therefore I claim:

1. A method process and apparatus for recycling abrasive blasting material comprises in combination,
   a self-contained mobile trailer assembly,
   a separation and recovery apparatus on said trailer assembly,
   said separation and recovery apparatus comprises,
   a primary large debris pre-screened separator,
   primary and secondary interlinked cyclonic air separators,
   magnetic drum separator in communication with said primary cyclonic separator,
   a vibratory screen separator, an airwash assembly and multiple dust collectors in communication with said respective cyclonic separators in independent staged sequence,
   means for transferring said abrasive blast material from said primary cyclonic air separator to said magnetic drum separator and cleaned abrasive blasting material from said airwash assembly to a storage and supply bin,
   a first vacuum source for drawing off contaminants from said airwash assembly and a second vacuum source for drawing off contaminant from said second cyclonic air separator, said first and second cyclonic air separators in communication with said respective vacuum sources and respective multiple dust collectors,
   a source of compressed air interconnected to said respective dust collectors for selective purging said dust collectors and to blast material outlet in said storage supply bin,
   a source of electrical power and control system for said separation apparatus.

2. The apparatus for recycling abrasive blast material set forth in claim 1 wherein said means for transferring said abrasive blast material from said primary cyclonic air separator to said magnetic separator and from said airwash assembly to said storage and supply bin comprises,
   independent material conveyor elevators extending respectively therebetween and a distribution auger on said storage and supply bin.

3. The apparatus for recycling abrasive blast material set forth in claim 1 wherein said primary cyclonic air separator is in direct communication with said primary large debris separator and indirectly with a source of contaminate abrasive blast material directly with said second cyclonic separator and indirectly with said magnetic drum separator and said vibratory screen and said airwash separator respectively.

4. The apparatus for recycling abrasive blasting material set forth in claim 1 wherein said respective dust collector in communication with said secondary cyclonic air separator is a high pressure filter having inlet and outlet and multiple filter bags therebetween and in communication with said second vacuum source.

5. The method and apparatus for recycling abrasive blasting material set forth in claim 1 wherein said source of compressed air comprises,
   an air compressor, an air dryer in communication therewith and air distribution purging manifolds.

6. The method and apparatus for recycling abrasive blasting material set forth in claim 1 wherein said first and second vacuum source comprises a low vacuum blower and a high vacuum blower respectively.

7. The method and apparatus for recycling abrasive blasting material set forth in claim 1 wherein said source of electric power is an onboard generator.

8. The method and apparatus for recycling abrasive blasting material set forth in claim 1 wherein said multiple dust collectors comprises,
   low pressure and high pressure dust filter assemblies, multiple dust bag cartridges therewithin and compressed air nozzle assemblies for purging said dust bag cartridges.

9. The method and apparatus for recycling abrasive blasting material set forth in claim 1 wherein a source of electrical power comprises an onboard generator and internal combustion engine.

10. A process for separation and recovery of contaminated abrasive blasting material from a work site wherein said method process comprises the steps of,
   a. transferring contaminated abrasive blasting material to a mobile self-contained separation recovering and reuse supply apparatus,
   b. separating initial contaminants within said contaminated abrasive blast material by a rotating large debris screen separator,
   c. separating airborne contaminants from said contaminated abrasive blast material from said rotating large debris screen separator by a first cyclonic separator,
   d. separating airborne contaminants by a second cyclonic separator in communication with said first cyclonic air separator,
   e. transferring said contamination abrasive blasting material from said first cyclonic air separator to magnetic drum separator,
   f. transferring said airborne contaminants from said second cyclonic air separator to a high pressure dust filter media,
   g. separating contaminants from said abrasive blasting material from said magnetic drum separator by a vibratory screen separator and specific gravity,
   h. transporting said abrasive blast material separated by said vibratory screen to an airwash specific gravity separator,
   i. transporting air entrained contaminants from said airwash separator to a low pressure dust filter medium,
   j. transferring clean abrasive blast material from said airwash separator into a holding and distribution reuse bin,
   k. reusing said clean abrasive blast material from said holding and distribution reuse bin,
   l. selectively purging said high and low pressure dust filter media by compressed air.

11. The process set forth in claim 10 wherein transferring air entrained contaminates from contaminated abrasive blast material from said first and second cyclonic separators to said dust filter media comprises,
   blowers in communication therewith.

12. The process set forth in claim 10 wherein transferring said abrasive blast material from said primary cyclonic separation to said magnetic drum separator, and from said airwash separator comprises,
   respective bucket elevators.

13. The process set forth in claim 10 wherein transferring air entrained contaminants from said airwash separator to said low pressure dust filter media comprises, an air blower in communication with said low pressure dust filter media.

14. The process set forth in claim 10 when reusing said clean abrasive blast material from said holding and distribution reuse bin comprises, compressed air infection from a compressed air source.

15. The process set forth in claim 10 wherein said purging said high and low pressure dust filter media by compressed air comprises,
   a source of compressed air, an air dryer in communication therewith, multiple nozzle assemblies within said respective dust filter media and compressed air distribution manifold in communication therewith and source of compressed air.

* * * * *